United States Patent [19]

Berreman

[11] 4,043,640
[45] Aug. 23, 1977

[54] LIQUID CRYSTAL TWIST CELL WITH GREY SCALE CAPABILITIES

[75] Inventor: Dwight Winton Berreman, Westfield, N.J.

[73] Assignee: Bell Telephone Laboratories, Incorporated, Murray Hill, N.J.

[21] Appl. No.: 617,074

[22] Filed: Sept. 26, 1975

[51] Int. Cl.² .................................................. G02F 1/13
[52] U.S. Cl. ............................................. 350/160 LC
[58] Field of Search .................................. 350/160 LC

[56] References Cited
PUBLICATIONS

Tarry; H. A., "Effect of Temperature on the Transient Repsonse of Twisted Nematic L-C Films", Elec. Lett., vol. 11, No. 15, July 24, 1975, pp. 339–341.
Gruler; H., "Elastic properties of the rematic phase influenced by molecular properties", Jour. of Chem. Physics, vol. 61, No. 12, Dec. 15, 1974, pp. 5408–5412.
Haller; I., "Electic Constants of Nematic Liquid Crystalline Phase. . . .", J. of Chem. Physics, vol. 57, No. 4, Aug. 15, 1972, pp. 1400–1405.

*Primary Examiner*—John K. Corbin
*Assistant Examiner*—Rolf Hille
*Attorney, Agent, or Firm*—Peter V. D. Wilde

[57] ABSTRACT

A liquid crystal twist cell is disclosed in which the transmission characteristics may be conveniently controlled so as to produce a grey scale. The elastic constants of the crystal are maintained within a specified range to enable the convenient variation of transmission characteristics.

4 Claims, 2 Drawing Figures

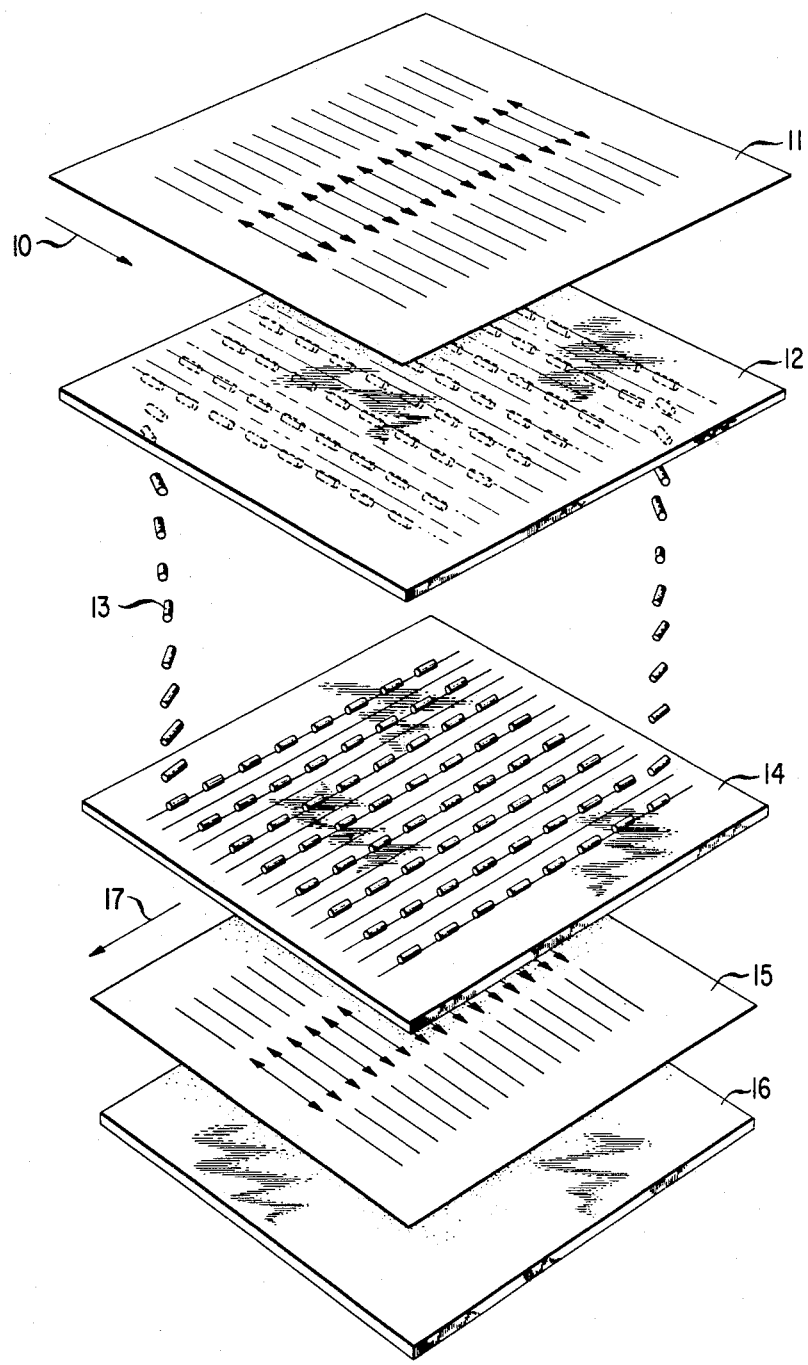

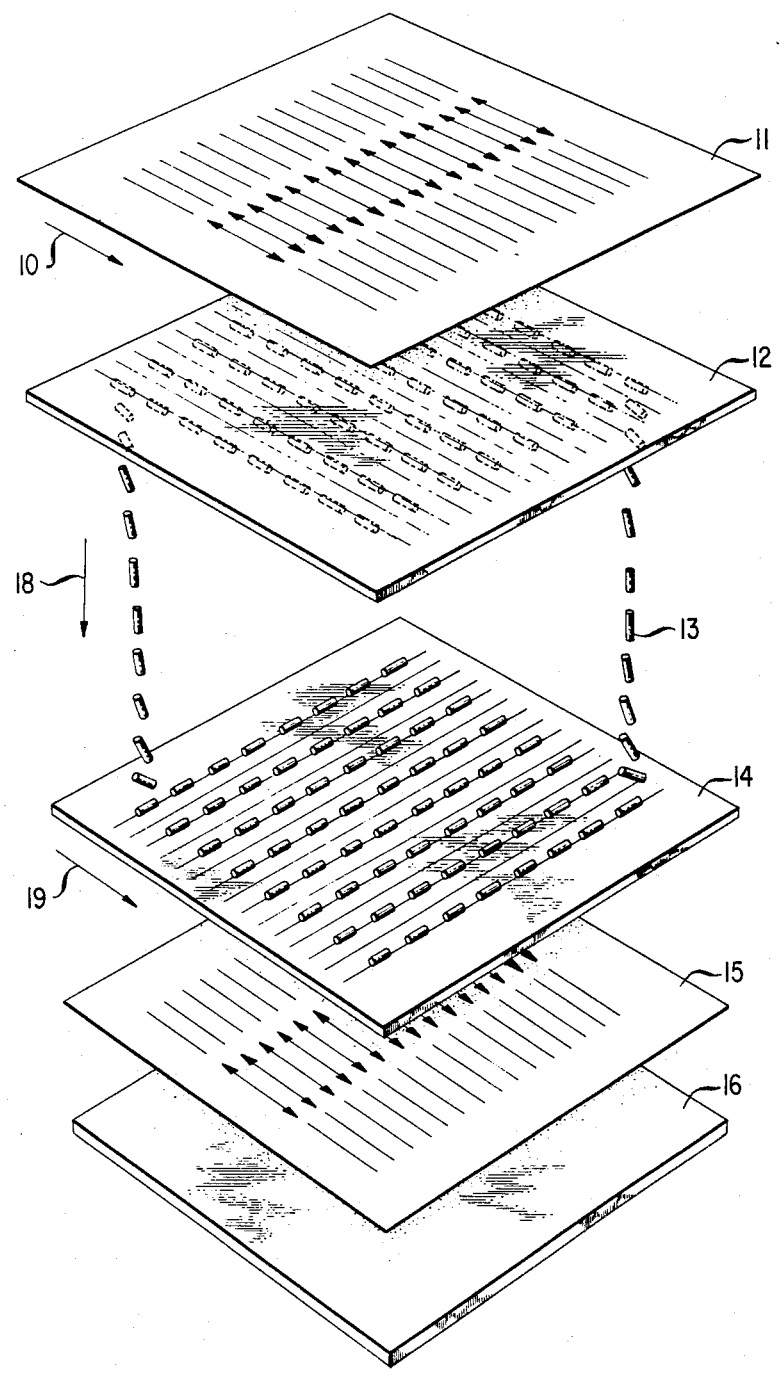

LIQUID CRYSTAL TWIST CELL WITH GREY SCALE CAPABILITIES

BACKGROUND OF THE INVENTION

1. Field of the Invention

This invention relates to a liquid crystal twist cell which has a variable transmission coefficient.

2. Description of the Prior Art

Liquid crystal devices have been the subject of intensive technological development for a number of years. Such devices may be utilized in optical memory units, display devices, or switches and require only small amounts of power for efficient operation. The liquid crystal devices fall into three distinct categories, depending upon their specific mode of operation.

In the "dynamic scattering devices" the transmission characteristics of the liquid crystal are altered by causing an ion current to flow through the crystalline material. The turbulence which is generated by this current flow is sufficient to render the otherwise transparent liquid opaque.

In a second class of devices the liquid crystal is mixed with an appropriate dye which is characterized by an anisotropic absorption coefficient. In this configuration the liquid crystal is used as a host which may be aligned by means of an electric field. The alignment of the liquid crystal host alters the alignment characteristics of the anisotropically absorbing dye. This alteration in the alignment of the dye affects its absorbing characteristics and hence alters the transmission properties of the device.

A third type of liquid crystal device—the twist cell—was first described by Schadt and Helfrich in Volume 18 of the *Applied Physics Letters* at page 127. Unlike the prior devices, the twist cell operates by rotating the direction of polarization of an incoming electro-magnetic wave.

In the twist cell a liquid crystal is sandwiched between two plane surfaces, with the liquid crystal molecules oriented approximately parallel to the surfaces. The molecules, although arranged in such a planar configuration, are still free to point in any given direction in the plane parallel to the surface. In a twist cell the distribution of directions of the individual molecules is made to continuously change from one surface to the other. In this manner a configuration of molecular orientations is formed which may be visualized as similar to the steps of a ladder which has been twisted into a helix about an axis which runs through the center of the steps. In this heuristic picture the steps represent the individual molecules. In a Schadt and Helfrich twist cell the total molecular rotation from one surface to another is about 90°, and hence these devices are sometimes referred to as "quarter-turn twist cells."

According to a well-known optical principle, light entering the crystal, polarized in the plane of the liquid crystal molecules near the entering surface, and either parallel or perpendicular to the molecules has its direction of polarization rotated as its traverses the crystal. The amount of rotation is equivalent to the amount of molecular twist.

If an electric field is applied to the crystal and is caused to point from one surface to the other, then the molecules in the central region of the cell will be aligned approximately parallel to the electric field rather than approximately parallel to the liquid crystal boundary surfaces. Such molecules will be approximately perpendicular to their previous "field off" position. In such a configuration light entering the crystal as before will not have its direction of polarization rotated and hence will traverse the liquid crystal unaffected.

It is apparent that if a polarizer is placed at the exit of a twist cell and is aligned parallel to the cell surface, but with its polarizing direction perpendicular to the alignment of the molecules closest to the exit surfaces, the light will only be transmitted through the polarizer when the field is on. This may be understood by considering that when the field is off, the polarizing direction of the polarizer is aligned to accept light whose initial polarization direction would not permit passage through the polarizer, but whose rotation by the twist cell permits such passage. However, when the field is on, the direction of polarization of the incoming light is not altered as it traverses the cell. Consequently, the light exits the crystal polarized in the same direction as when it entered the cell. Since the polarizing direction of the polarizer is aligned in this direction, the light will be transmitted through the polarizer. A reflecting surface placed beyond the polarizer will cause the light to be reflected back through the cell for viewing purposes. If the polarizer is rotated by 90° the cell will be "off" when the field is on, as opposed to the above mode of operation.

While the above devices are attractive for many applications, the abrupt change in the transmission of the twist cell limits its application. Specifically, when used for display purposes, the cell cannot easily reproduce pictorial information because of difficulty in displaying grey tones.

SUMMARY OF THE INVENTION

I have analyzed the optical properties of liquid crystal twist cells. I have studied the dependence of these optical properties on the molecular orientation at the two plane surfaces; the thickness of the liquid crystal layer; the electric or magnetic field applied across the liquid crystal; the dielectric or magnetic anisotropy of the liquid crystal; the direction and wavelength of the incident light; the optical anisotropy of the liquid crystal; and the three elastic and five viscous parameters associated with the liquid crystal. As a result, I have shown that when the elastic parameters of the liquid crystal are maintained within a specified range, the transmission characteristics of the cell vary more gradually with the magnitude of the applied field. Consequently, a useful grey scale may be generated by controlling the magnitude of the field applied to the cell. A plurality of such cells may then be utilized for both static and dynamic pictorial display purposes.

BRIEF DESCRIPTION OF THE DRAWING

FIG. 1 is a representation of a liquid crystal quarter turn twist cell in the absence of any external alignment means applied to orient the liquid crystal molecules in a direction perpendicular to the cell surface.

FIG. 2 is a representation of a liquid crystal quarter turn twist cell with an alignment means applied to orient the liquid crystal molecules in a direction perpendicular to the cell surface.

DETAILED DESCRIPTION

In FIG. 1 the elements of a liquid crystal quarter turn twist cell are displayed. The particular device shown has additional elements which allow it to be used as an ambient light display device. Such a device requires no internal light source for the operation but rather reflects ambient light. In FIG. 1 no external alignment means is being applied and the device, as shown, is in a non-reflecting mode.

A quarter turn twist cell requires polarized incident light for its proper operation. For applications which utilize ambient unpolarized light, a polarizer, 11, is needed. In this manner the light entering the first cell surface, 12, is polarized parallel to the directed irregularities of this surface, as shown by the arrow 10. The polarizer may alternatively be aligned at right angles to the irregularities with concomitant alterations in the alignment of other elements, when necessary. The irregularities are on the inner surface of 12, which is exposed to, and consequently orients, the molecules of the liquid crystal, 13.

The orienting surface 12, may be of any material transparent to the light being utilized. This light is usually in the optical range from 4500 Angstroms to 7500 Angstroms. The material 12, or a surface applied to it, must be conducive to any one of several treatments which enable it to orient the liquid crystal molecules adjacent to the surface. Such treatments include etching or grooving the surface, and are further discussed in my U.S. Pat. No. 3,787,110. As will be discussed in the description of FIG. 2, the cell also requires an external alignment means, usually in the form of an electric or magnetic field, applied to the cell. To facilitate the application of such a field the surface 12 may be coated with a transparent conducting material to which a voltage may be applied in order to establish the field.

The liquid crystal material 13 is located between the surface 12 and an essentially similar surface 14. However, while the surface 14 is parallel to the surface 12, its directed structures are oriented approximately perpendicular to those of the surface 12.

As the orientation angle changes from 90 degrees the contrast ratio of the device decreases. It is consequently preferable that the orientation be within 5° of 90°. Since the molecules nearest the surfaces orient themselves parallel to the directional structures of these surfaces, the intermolecular forces tend to result in a twisted crystal configuration when the surfaces are oriented as in FIG. 1. The twisted configuration of the liquid crystal molecules 13 is shown in FIG. 1.

As discussed in the section on prior art, light polarized in the direction shown by the arrow 10 tends to have its direction of polarization rotated by the twist of the liquid crystal molecules. After traversing the liquid crystal, the light is polarized in the direction shown by the arrow 17 and passes through the surface 14. In order to effectively rotate the direction of polarization of the light, the thickness of the liquid crystal layer should be at least twice the wavelength of the light.

A polarization analyzer 15, if aligned as shown in FIG. 1, will prevent the further transmission of the light 17. The surface 16, capable of reflecting light at the operating wavelength, will be ineffective in that no light will reach it. In this configuration the device is normally off. The polarizer, in an alternative configuration, may be aligned to pass light of polarization represented by 17 in which case the device will be normally on. For the purposes of the following discussion, however, we will assume the configuration shown in FIG. 1.

With the device in the normally off configuration, an external means is required which will enable the device to be turned on when desired. It is found that an electric or magnetic field may serve this purpose. The device of FIG. 1 is reproduced in FIG. 2 with the additional field represented by the arrow 18. The means for producing this field may be external to the device or may be in the form of conducting surfaces on the layers 12 and 14 as mentioned above. An appropriate voltage for example, applied to such conducting surfaces would support the necessary field. An A.C. voltage is preferable insofar as it does not produce crystal degrading ion currents. If the liquid crystal is of positive dielectric anisotropy the liquid crystal molecules will align under the influence of the field as shown in FIG. 2. In such a configuration the molecules are ineffective in rotating the direction of polarization of the incident light 10, and such light will leave the crystal material in the orientation shown by the arrow 19. This is the critical effect of the field 18, insofar as in this configuration the light is now transmitted by the polarizer 15 and reflected back through the cell by the surface 16. To the viewer the device then appears "on." Numerous such devices may be fabricated in any array capable of alphanumeric display.

The device as described has a number of undesirable optical characteristics which have recently been shown to be amenable to improvement. Such improvement is discussed in my commonly assigned application entitled "Liquid Crystal Twist Cells." However, the device even as improved, has essentially only two modes of operation—"on" or "off." The reason for this is associated with the nature of the response of the crystal to the orienting field. A particular threshold value of field magnitude must be reached before any significant orientation occurs. However, once this threshold value is reached, small changes in the field result in significant reorientation of the molecules toward a direction parallel with the field lines. Consequently, the range of field values for which the crystal is only partially reoriented, is very small. It is difficult under such circumstances to accurately and reproducibly partially reorient the crystal. The ability to partially reorient the crystal would enable one to fabricate a twist cell with easily variable transmission characteristics and therefore with the capability for grey scale reproduction. It is clear that a device capable of reproducing even a limited grey scale would have wide application. Such a device could be used for static or dynamic pictorial representations. However, in typical liquid crystal twist cells, once the threshold field has been applied the crystal molecules are efficiently realigned by the applied field and hence there is little opportunity for intermediate modes of partial transmission.

I have discovered that the alignment efficiency of an applied field is closely related to the ratio $k_{11}/k_{33}$, where $k_{11}$ and $k_{33}$ are specific elastic constants. These constants are well known in the art. $k_{11}$ is related to the resistance to splay among adjacent molecules, and $k_{33}$ is related to the resistance to bend among the adjacent molecules. In typical liquid crystals, $k_{11}/k_{33}$ is greater than 0.4. For such values the molecules rapidly realign over small values of applied field change once the threshold field value has been reached. I have shown that for elastic constant ratios in the range $$0.01 \leq \frac{k_{11}}{k_{33}} \leq 0.3 \tag{1}$$

the molecules realign over a much larger range of applied field change. Under such conditions it is more practical to apply specific field values over which the molecules are only partially realigned perpendicular to the orienting surfaces. For these values the cell is partially transmitting and a "grey scale" may be reproduced easily by applying fields of appropriate value.

The limits in Equation (1), determine the magnitude of field change required to go from nonalignment to essentially complete alignment of the liquid crystal. The upper value in Equation (1) results in a field range amenable to practical grey scale reproduction. However, this limit may be further lowered, resulting in a more detailed grey scale and less stringent requirements on the reproducibility of the particular field values.

The device illustrated in FIGS. 1 and 2 includes a reflective surface for display purposes. However the ability to reproduce grey scales is applicable to the simple transmission device, without the reflective surface, as well, and the practice of this invention will significantly broaden the application of such devices. Furthermore, for the purposes of illustration a quarter turn twist cell has been discussed. However a twist cell with some other angle of twist may be equally effective. For example, the 90° orientation of the grooved structures would allow for a three quarter turn or higher order turn twist cell.

EXAMPLE 1

The parameters constituting a preferred embodiment may be confidently stated on the basis of both the laboratory experiments and computer simulations performed by the applicant. In such an embodiment the orienting surfaces represented in FIGS. 1 and 2 by 12 and 14 are square glass surfaces one centimeter on each side. A layer of tin oxide, applied to these surfaces, is used to produce an electric field by means of an appropriate alternating voltage. As discussed before, an alternating field eliminates the destructive effects that the passage of a current, associated with a static field, has upon the liquid crystal. A layer of silicon oxide is then evaporated onto the tin oxide surface from an angle of 5° relative to the surface. Such an evaporation process results in the appearance of directed groove structures, separated by approximately 100 Angstroms, in the shadow direction of the evaporation. It is found that such a structure imparts an approximate initial 5° orientation relative to the surface to the molecules closest to the grooved surface, thereby increasing the field's efficiency in flipping the molecular direction to the direction shown in FIG. 2.

In this embodiment, the liquid crystal is a 10 micron layer of 4-cyano-4'-n-octyl biphenyl. The elastic constant ratio is brought within the range of Equation (1) by elevating the temperature of the crystal to approximately 34.2° C. At this value the elastic constant ratio indicated in Equation (1) is approximately 0.1. The temperature necessary to achieve this ratio will depend upon the purity of the crystal, and, depending upon this purity, will be within a range of about 10°. The specific temperature required is approximately one-half a degree above the smectic to nematic transition point. This transition point may be determined according to principles well known in the art and consequently, the specific temperature required for this embodiment may be easily determined independent of the degree of purity of the crystal.

The polarizer is a commercially available POLAROID® polarizing filter and is oriented as shown in FIGS. 1 and 2. The reflective surface is a simple silvered mirror. The device constructed according to this example displays an extended field range in going from nonalignment to essentially complete alignment of the liquid crystal. It is consequently, particularly amenable to the reproduction of grey scales.

What is claimed is:

1. A liquid crystal twist cell device with improved grey scale capabilities, said device containing a liquid crystal material of positive dielectric anisotropy characterized in that the relationship between the elastic constants of the liquid crystal is given by $$0.01 \leq \frac{k_{11}}{k_{33}} \leq 0.3 .$$

2. A liquid crystal twist cell device with improved grey scale capabilities comprising:
a first surface capable of transmitting optical radiation, and capable of inducing alignment of the liquid crystal molecules in contact with the said surface;
a layer of liquid crystal material of positive dielectric anisotropy;
a second surface capable of transmitting optical radiation, and capable of inducing alignment of liquid crystal molecules in contact with the said second surface, the two said surfaces bounding the liquid crystal, said second surface aligned parallel to said first surface but oriented so as to align the said molecules in contact with it at an angle of approximately 90° relative to the molecules in contact with said first surface, but in a plane parallel to said molecules in contact with said first surface;
a polarization analyzer adjacent and approximately parallel to one of said surfaces;
means to apply at least three different electric field values to the liquid crystal and thereby at least partially realign the liquid crystal molecules perpendicular to the plane of said surfaces;
the invention characterized in that
the relationship between the elastic constants of the liquid crystal is given by $$0.01 \leq \frac{k_{11}}{k_{33}} \leq 0.3 .$$

3. The device of claim 1 wherein both the first surface and the second surface are bounded by the liquid crystal on one side and by a polarization analyzer on the other side.

4. The device of claim 1 wherein the first and second surfaces are endowed with grooved structures thereby making them capable of inducing alignment of the liquid crystal molecules in contact with the said surfaces.

* * * * *